July 28, 1959 J. F. KOLAR 2,896,971
VALVE ACTUATOR FOR FLUID CONNECTOR
Filed Aug. 31, 1954
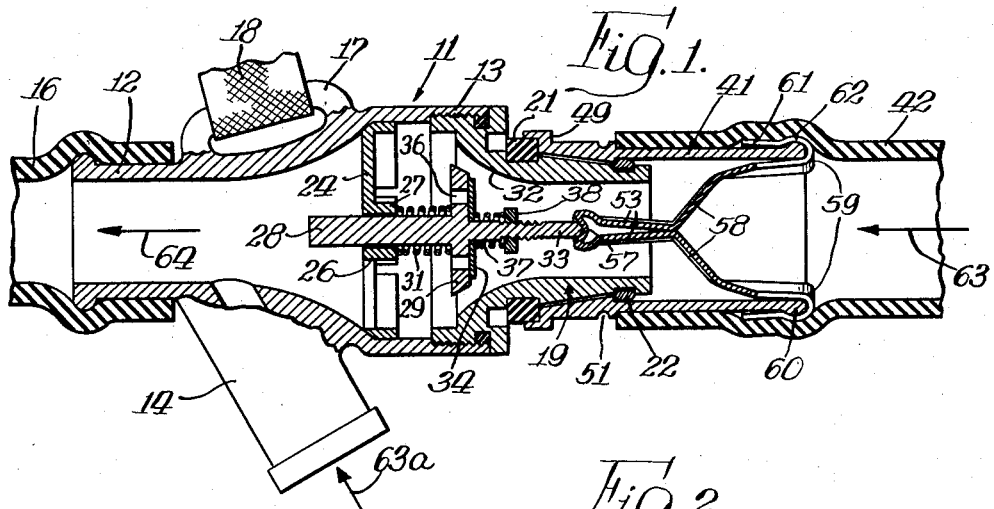
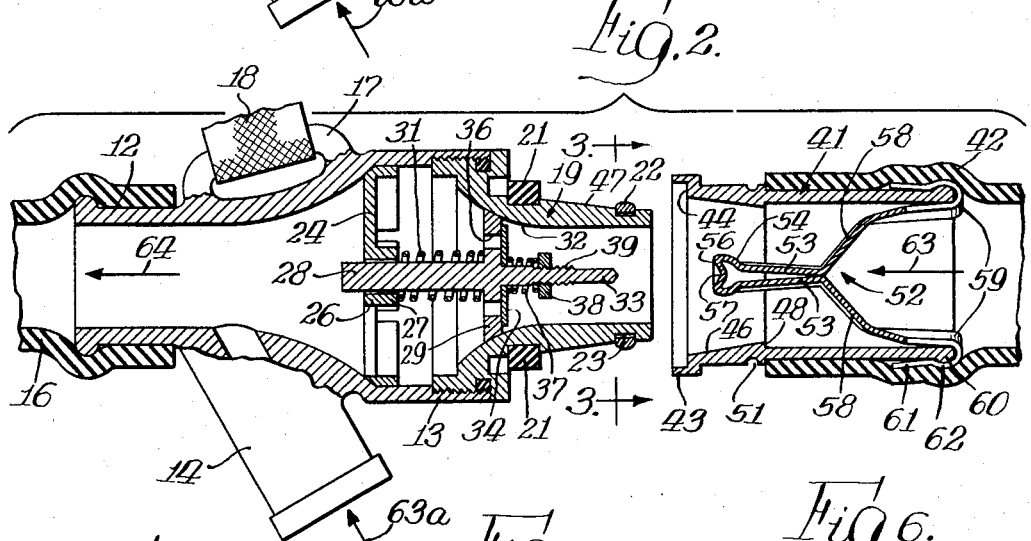
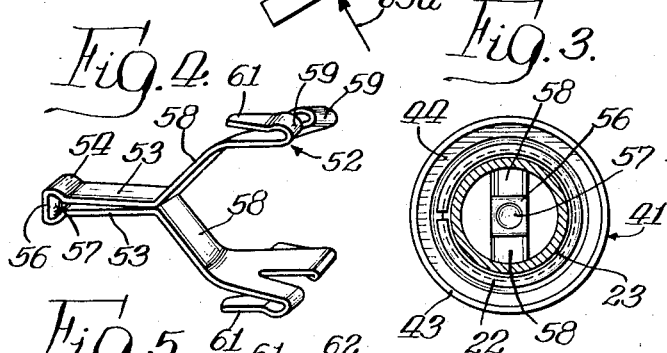
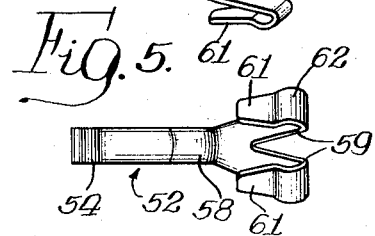
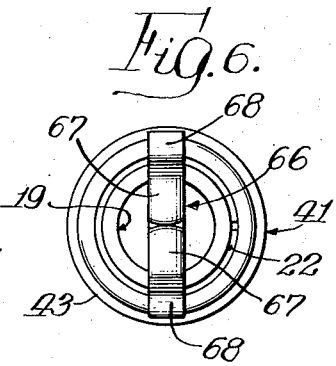
INVENTOR.
Joseph F. Kolar,
BY
Davis, Lindsey, Hibben - Noyes
Atty's.

United States Patent Office 2,896,971
Patented July 28, 1959

2,896,971

VALVE ACTUATOR FOR FLUID CONNECTOR

Joseph F. Kolar, Chicago, Ill.

Application August 31, 1954, Serial No. 453,377

7 Claims. (Cl. 284—4)

This invention relates to improvements in fluid connector assemblies and more particularly to a novel valve actuator for use in such assemblies.

In oxygen supply systems such as used in aircraft or the like, particularly military aircraft, a main supply system is usually provided for the plane with a plurality of individual connecting lines or hoses adapted to be attached to the oxygen masks of the individual occupants. At the same time, each occupant of the plane may have an individual oxygen tank strapped to his person which also has a conduit or hose communicating with the mask. A three-way fitting is ordinarily provided having more or less permanent connections by means of flexible hose or the like with the oxygen mask and the individual oxygen supply or tank. The fitting also has means for detachably connecting it to one of the oxygen lines of the plane oxygen supply. In addition, the fitting contains a valve which is normally closed when the fitting is detached from the plane oxygen supply so that the mask is in direct fluid communication with the individual oxygen supply, e.g. if the occupant desires to move around appreciably inside the plane or if it becomes necessary to jump from the plane.

When the plane oxygen supply is connected to the fitting, means must be provided for automatically holding the fitting valve in open position so as to provide fluid communication from the main oxygen supply to the mask. Heretofore, the means for automatically opening the fitting valve when the fitting is connected to the main oxygen supply has consisted of a relatively expensive special part inserted in the hose connector. The construction of this part has been such that close manufacturing tolerances were necessary which greatly interferes with the rapid and economical production of the part. Furthermore, special assembly steps were involved in completing the connector assembly with its valve actuating component. The present invention, as will hereinafter appear, greatly simplifies both the structure and assembly of this portion of the device with resulting economy of manufacture and ease of use.

Accordingly, a primary object of my invention is to provide a novel and improved valve actuator for a fluid connector of the general type described.

A further object of the invention is to provide novel improvements in a fluid connector assembly adapted for detachable connection with a valved fitting of the general character herein described.

Another object of the invention is to provide novel valve actuating means for use on a fluid connector of the type here involved which is characterized by being extremely simple and economical to manufacture, assemble, and use.

Other objects and advantages of the invention will become apparent from the subsequent detailed description taken in conjunction with the accompanying drawing, wherein:

Fig. 1 is a longitudinal sectional view of a fitting for an oxygen mask and showing a fluid connector assembly attached thereto, the fluid connector assembly comprising one specific embodiment of the present invention;

Fig. 2 is a view similar to Fig. 1 but showing the fluid connector assembly in detached relation from the fitting;

Fig. 3 is a transverse sectional view as taken along the line 3—3 of Fig. 2;

Fig. 4 is a perspective of a novel valve actuating element as detached from the fluid connector assembly;

Fig. 5 is a side elevational view of the element shown in Fig. 4; and

Fig. 6 is an end view of a fluid connector assembly showing a modification of the invention.

Referring first to Figs. 1 to 5 of the drawing, the invention is illustrated herein in conjunction with a three-way connector and control valve unit, indicated generally at 11, of the type used with an individual oxygen mask as heretofore described. Although a description of the unit 11 is necessary for a proper understanding of my invention, it should be understood that the unit 11 comprises no part of the present invention. The unit 11 comprises an elongated tubular body portion having a relatively small diameter outlet end 12 and an enlarged diameter inlet end 13. A second inlet connection 14 extends at an angle to the elongated tubular body portion of the fitting 11 and is in direct fluid communication with the narrow diameter outlet end portion 12. A flexible rubber hose 16 is fitted over the outlet end portion 12 and extends to an oxygen mask (not shown). The inlet 14 is adapted to be connected by hose or other means to a portable oxygen supply such as a small oxygen tank or flask strapped to the body of the user. The enlarged inlet end portion 13 of the fitting 11 is adapted to be detachably connected, by means hereinafter described, to a main oxygen supply on the aircraft. The fitting 11 is also provided with an integral loop 17 to which a tape or strap 18 may be attached for suspending the fitting from the body or clothing of the user. Thus, it will be understood that the fitting 11 remains on the person of the user at all times and the connections between the fitting and the oxygen mask via the hose 16 and between the personal oxygen supply and the fitting 11 via the inlet 14 are more or less permanent connections which are not disturbed in the normal course of use. In other words, it is only the connection between the fitting 11 and the main oxygen supply on the plane that is readily detachable. In this way, when the occupant is in a more or less stationary location in the plane, he may make use of the main oxygen supply of the ship. However, when it is necessary to move around appreciably inside the plane or if it should become necessary to jump from the plane, the connection with the main oxygen supply can be disrupted and the individual oxygen supply from the pilot's person is then utilized.

The enlarged inlet end portion 13 of the fitting 11 has threadedly attached thereto a reducing bushing 19 having a resilient ring seal 21 seated in an external peripheral groove in the bushing 19. The outer end of the bushing 19 is provided with a split resilient spring ring 22 which is seated in a peripheral groove 23 for providing a snap-fit detachable connection with a connector assembly as hereinafter described. Extending transversely across the enlarged inlet end portion 13 of the fitting 11 and disposed axially inwardly from the end thereof is a valve support 24 in the form of a disk-like member having a plurality of apertures 26. The valve support 24 has a central apertured hub portion 27 in which an elongated valve stem 28 is slidably mounted for axial movement therein. The valve stem 28 carries a generally annular disk-like valve member 29, and a spring 31 disposed around the stem 28 coacts between the fixed hub portion 27 of the valve support and the valve member 29 for normally urging the latter into seated or closed position against the internal tapered wall portion, indicated at 32, of the bushing 19 (Fig. 2). The valve stem 28 also has an elongated extension 33 which extends axially almost to the outer end of the bushing 19 and provides an acutating portion for opening the valve member 29 in the manner described below. The extension 33 also carries exhaust valve means in the form of a disk member 34 slidably mounted on the extension 33 and adapted to close a plurality of openings 36 in the valve member 29. For releasably holding the disk 34 in closed position over the apertures 36, a small spring 37 surrounds the extension 33 and coacts between the disk 34 and an adjustable nut 38 which is mounted on a threaded portion 39 of the extension 33. Obviously, by adjustment of the nut 38, the spring pressure against the disk 34 can be regulated so as to permit opening of the valve 34 at a predetermined exhaust pressure.

Coming now to the detachable connector assembly which comprises the subject matter of the present invention, a tubular connector member designated generally at 41 is provided having a flexible rubber hose 42 attached to the outer or inlet end thereof, the hose 42 extending from the main oxygen supply of the aircraft as heretofore described. The opposite or outlet end of the tubular connector 41 is adapted to fit over the reduced outer end of the bushing 19 in male-female or telescoping relation therewith in the manner indicated in Fig. 1. Thus, the inner end extremity of the tubular connector 41 is formed with an axial flange 43 and a radial shoulder 44 adapted to fit snugly against the outer circumferential and outer axial end walls, respectively, of the seal ring 21 thereby providing a fluid-tight connection. From the radial shoulder 44, the inner wall of the connector 41 tapers inwardly, as at 46, to conform closely to a corresponding external taper 47 on the bushing 19. The inner end of the tapered portion 46 on the connector 41 terminates in an abrupt shoulder 48 so that the retainer or spring ring 22 on the bushing 19 can snap into place behind the shoulder 48 for detachably holding the connector 41 in assembled relation with the bushing 19. As will readily be understood from Fig. 1, the cooperating parts are so dimensioned that the connector 41 must be pressed axially with some force against the compressible resilient ring 21 in order to permit the shoulder 48 to snap over the ring 22. It may also be mentioned that the connector 41 is preferably supported in a swivel device (not shown) which can be detachably clipped to the user's clothing or any other convenient support so as to remove any strain on the detachable connection between the fitting 11 and the connector 41. The connector 41 may extend through an aperture in the swivel device and may be retained thereon between an outer shoulder 49 and a retainer ring (not shown) which can be fitted in a groove 51 on the connector 41.

As previously mentioned, when the fitting 11 is connected to the main oxygen supply, some means must be provided for opening the normally closed valve 29 so as to permit fluid communication between the oxygen mask and the main oxygen supply. For this purpose, I provide a valve actuating member in the form of an insert which can readily be attached at the interior of the tubular connector 41 and which will provide the desired valve actuation without substantial interference with the flow of fluid through the device. Broadly speaking, this insert consists of a unitary member providing a rigid abutment for engaging the end of the valve extension 33 and also having resilient means for firmly but detachably securing the insert to the tubular connector 41.

Thus, in the embodiment shown in Figs. 1 to 5, the insert, designated generally at 52, comprises an elongated strip of suitable spring metal folded to provide a generally Y-shaped configuration, as most clearly seen in Fig. 4. The elongated strip is doubled back upon itself, as at 53—53, to form the stem portion of the Y which extends axially with respect to the tubular connector 41. Adjacent the central fold, the strip portions 53 flare outwardly to a slight extent, as at 54, and are integrally interconnected by an end wall portion 56. The end wall 56 has a slight depression 57 for facilitating endwise axial engagement thereof with the end of the valve stem extension 33. The end portions of the folded strip diverge outwardly from the stem portions 53, as at 58, to form the arms of the Y. The outer end extremities of the arms 58 are formed with reversely bent generally U-shaped resilient clip portions 59 which are adapted to have a tight frictional but releasable snap-fit over a bead or rim 60 on the inlet end of the connector 41. In this particular instance, two such reversely bent resilient clips 59 are provided on each of the arms 58. The outer part, designated at 61, of each U-shaped clip 59 has an outward bulge 62 to provide snug snap-fit conformation with the bead 60. When the clip portions 59 are fitted over the inlet end of the tubular connector 41, as shown in Figs. 1 and 2, the hose 42 overlies the outer parts 61 of the clips and thereby assists in retaining the clips 59 in snug engagement with the connector 41.

With the valve actuator insert 52 mounted as shown in Figs. 1 and 2, the axially extending stem portion 53—53 of the insert 52 is disposed coaxially with the valve stem extension 33 so that when the device is assembled, as in Fig. 1, the extension 33 is rigidly engaged by the end wall 56 thereby shifting the valve 29 axially to the open position shown in Fig. 1. Also, the arms 58 of the Y-shaped insert tend to spread outwardly as a result of their inherent resiliency and must be compressed somewhat for insertion into the connector 41. The axial thrust pressure exerted against the stem 53—53 tends to urge the arms 58 and the inside parts of the clips 59 into even tighter engagement with the bore of the connector 41.

In the use of the device it will be seen that when the unit 11 is connected to the ship oxygen supply, as seen in Fig. 1, direct flow of oxygen is provided through the open valve 29 to the oxygen mask as indicated by the direction of flow arrows 63 and 64. In this condition, the personal oxygen supply may be turned off so that the inlet 14 is not in use. To disconnect the fitting 11 from the ship oxygen supply, the user exerts an axial pull on the connector 41 sufficient to disengage the shoulder 48 from the spring snap ring 22. The swivel clip or other support means for the connector 41 is, of course, released at this point. With the tubular connector 41 in detached relation as shown in Fig. 2, the valve spring 31 restores the valve member 29 to the closed position shown in Fig. 2 thereby sealing off the open end of the bushing 19. The personal oxygen supply may now be turned on so that the fluid flow to the oxygen mask takes place through the inlet 14 and the outlet 12 via the direction of flow arrows 63a and 64.

In Fig. 6, I show a modification of the valve actuating insert which is designated generally at 66. The general structural features are exactly the same, the insert 66 having the same general Y-shape shown in the Fig. 4 embodiment. However, in this case the outer arms of the Y, designated at 67, are each provided with only a single reversely bent clip portion 68 which has a snap-fit over the end rim of the tubular connector 41. Dependent upon the particular resistance to opening movement of the valve 29, the retaining clip structure at the outer ends of the insert arms may thus be modified to provide the desired holding characteristics. For most uses, I have found that the single reversely bent clip 68 on each arm of the insert is adequate.

From the foregoing, it will be seen that my invention provides an extremely simple unitary member which is quite inexpensive to manufacture and which can readily be attached to a tubular fluid connector for providing valve actuation of the character herein described. Careful tolerances and extreme care in the manufacture of the insert are unnecessary because of the spring clip detachable connection of the insert over the inlet end of the tubular connector. Moreover, the arrangement is such that the flexible hose or other conduit attached to the tubular connector serves to retain the clip portions of the insert in substantially rigid operating relation at all times. In place of the resilient spring clips herein specifically described for attaching the insert to the tubular connector, I may provide any suitable releasable resilient means for attaching the insert in snap-fit relation to either the inner bore of inlet end portions of the connector.

Although the invention has been described with particular reference to certain specific structural embodiments thereof, it will be understood that various modifications and alternative structures may be resorted to without departing from the scope of the invention as defined in the appended claims.

I claim:

1. An attachment for a tubular fluid connector comprising valve actuating means adapted to be disposed centrally within the connector in fixed relation thereto for engaging and disengaging a movable valve member carried by a companion fitting to which the connector is detachably securable at one open end thereof, a plurality of divergent supports extending outwardly from said valve actuating means toward opposite wall portions of the connector, and resilient clip means at the outer ends of said supports adapted to provide a resilient detachable snap-fit over the opposite open end of the connector for holding the attachment in substantially rigid assembled relation therewith whereby said actuating means is adapted to engage and disengage the valve member when the connector is respectively connected to and disconnected from the companion fitting.

2. A valve actuating attachment for a tubular fluid connector having a peripheral bead at one end thereof, said attachment comprising an elongated relatively rigid actuating portion adapted to be disposed substantially coaxially within the connector in fixed relation thereto for engaging and disengaging an axially shiftable valve member carried by a companion fitting to which the connector is detachably securable at its opposite end, a plurality of divergent supports extending outwardly from said actuating portion toward opposite wall portions of the connector, and resilient clip means at the outer ends of said supports adapted to provide a resilient detachable snap-fit over the bead at said one end of the connector for holding the attachment in substantially rigid assembled relation therewith whereby said actuating portion is adapted to engage and disengage the valve member when the connector is respectively connected to and disconnected from the companion fitting.

3. The structure of claim 2 further characterized in that said clip means comprises reversely bent outer end portions on said supports adapted to receive the beaded end of the connector in tight resilient snap-fit relation therein.

4. A valve actuating attachment for a tubular fluid connector having a peripheral bead at one end thereof, said attachment comprising a generally Y-shaped member having an axially extending stem portion adapted to be disposed centrally within the connector in fixed relation thereto for engaging and disengaging at one end thereof an axially shiftable valve member carried by a companion fitting to which the connector is detachably securable at its opposite end, said Y-shaped member also including a pair of resilient arm portions diverging outwardly from the other end of said stem portion for engaging opposite wall portions of the connector, and reversely bent generally U-shaped resilient clip portions at the outer ends of said arm portions adapted to fit over and receive therein the axial end portion and bead at said one end of the connector for resiliently holding the attachment in detachable snap-fit substantially rigid assembled relation on the connector whereby said stem portion is adapted to engage and disengage the valve member when the connector is respectively connected to and disconnected from the companion fitting.

5. The structure of claim 4 further characterized in that said member is formed from a unitary elongated strip of spring metal folded centrally on itself to provide said stem portion with the end portions of the folded strip diverging outwardly to form said arm portions and with the outer extremities of the strip reversely bent to form said clip portions.

6. In combination, a tubular connector, a valve actuating insert having abutment means disposed centrally within said tubular connector in fixed relation thereto for engaging and disengaging a movable valve member carried by a companion fitting to which the connector is detachably securable at one open end thereof, resilient clip means extending from said abutment means and providing a detachable resilient snap-fit engagement over the opposite open end of said connector for holding the insert thereon, and a hose fitted over said opposite end of said connector and coacting with the connector and with said clip means to assist in holding said fastening means in substantially rigid assembled relation with said connector whereby said abutment means is adapted to engage and disengage the valve member when said connector is respectively connected to and disconnected from the companion fitting.

7. In combination, a tubular connector having a peripheral bead at one end thereof, a valve actuating insert having a relatively rigid actuating portion disposed centrally in said connector in fixed relation thereto for engaging and disengaging an axially shiftable valve member carried by a companion fitting to which the connector is detachably securable at its opposite end, a plurality of supports diverging outwardly from said actuating portion and resiliently engaging opposite wall portions of the connector, reversely bent generally U-shaped clip portions at the outer ends of said supports, said clip portions having a resilient detachable snap-fit over the bead at said one end of the connector, and a hose fitted over said one end of the connector and coacting with said connector and with said clip portions to assist in retaining said clip portions in engagement with the connector in substantially rigid assembled relation therewith whereby said actuating portion is adapted to engage and disengage the valve member when said connector is respectively connected to and disconnected from the companion fitting.

References Cited in the file of this patent

UNITED STATES PATENTS

| 278,961 | Hobbs | June 5, 1883 |
| 1,459,100 | Henning | June 19, 1923 |
| 2,413,106 | Kelle | Dec. 24, 1946 |
| 2,434,167 | Knoblauch | Jan. 6, 1948 |

FOREIGN PATENTS

| 545,168 | France | July 13, 1922 |